(12) United States Patent
Mappouras et al.

(10) Patent No.: US 10,802,977 B2
(45) Date of Patent: Oct. 13, 2020

(54) MEMORY PAGE ACCESS COUNTS BASED ON PAGE REFRESH

(71) Applicant: ADVANCED MICRO DEVICES, INC., Santa Clara, CA (US)

(72) Inventors: Georgios Mappouras, Santa Clara, CA (US); Amin Farmahini Farahani, Santa Clara, CA (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 32 days.

(21) Appl. No.: 16/218,389

(22) Filed: Dec. 12, 2018

(65) Prior Publication Data

US 2020/0192809 A1    Jun. 18, 2020

(51) Int. Cl.
*G06F 12/08* (2016.01)
*G06F 12/0882* (2016.01)
*G06F 3/06* (2006.01)

(52) U.S. Cl.
CPC ........ *G06F 12/0882* (2013.01); *G06F 3/0604* (2013.01); *G06F 3/0658* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 9,934,148 B2 | 4/2018 | Roberts et al. |
| 2013/0033950 A1* | 2/2013 | Yeh ........................ G11C 11/406 365/222 |
| 2018/0181492 A1 | 6/2018 | Gupta et al. |
| 2019/0138437 A1* | 5/2019 | Bennett ................. G06F 3/0611 |

OTHER PUBLICATIONS

Lee, Soyoon, et al., "Characterizing Memory Write References for Efficient Management of Hybrid PCM and DRAM Memory", IEEE 19th Annual International Symposium on Modelling, Analysis, and Simulation of Computer and Telecommunications Systems, Jul. 25-27, 2011, 8 pages.
Dhiman, Gaurav, et al., "PDRAM: A hybrid PRAM and DRAM Main Memory System", 46th Annual ACM/IEEE Design Automation Conference, Jul. 26-31, 2009, 6 pages.
Ramos, Luiz, et al., "Page Placement in Hybrid Memory Systems", Proceedings of the International Conference on Supercomputing, May 31-Jun. 4, 2011, 11 pages.
Seok, Hyunchul, et al., "Efficient Page Caching Algorithm with Prediction and Migration for a Hybrid Main Memory", ACM SIGAPP Applied Computing Review, vol. 11, Iss. 4, 2011, 11 pages.

(Continued)

*Primary Examiner* — Kevin Verbrugge (57) ABSTRACT

A processing system tracks counts of accesses to memory pages using a set of counters located at the memory module that stores the pages, wherein the counts are adjusted at least in part based on refreshes of the memory pages. This approach allows a processing system to efficiently maintain the counts with relatively small counters and with relatively low overhead. Furthermore, the rate at which the counters are adjusted, relative to the page refreshes, is adjustable, so that the access counts are useful for a wide variety of application types.

20 Claims, 6 Drawing Sheets

(56) References Cited

OTHER PUBLICATIONS

Dong, Xiangyu, et al., "Simple but Effective Heterogeneous Main Memory with On-Chip Memory Controller Support", Proceedings of the 2010 ACM/IEEE Conference for High Performance Computing, Networking, Storage and Analysis, Nov. 13-19, 2010, 11 pages.
Agarwal, Neha, et al., "Page Placement Strategies for GPUs within Heterogeneous Memory Systems", ACM SIGPLAN Notices, vol. 50, Iss. 4, Apr. 2015, 28 pages.
Lee, Hyung Gyu, et al., "Low-Energy Heterogeneous Non-volatile Memory Systems for Mobile Systems", Journal of Low Power Electronics, vol. 1, Iss. 1, 2005, 18 pages.
Drongowski, Paul J., "Instruction-Based Sampling: A New Performance Analysis Technique for AMD Family 10h Processors", AMD CodeAnalyst Project, Nov. 16, 2007, 14 pages.

* cited by examiner

MEMORY PAGE ACCESS COUNTS BASED ON PAGE REFRESH

GOVERNMENT LICENSE RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Processing systems typically include one or more memory modules to store data and instructions on behalf of a processor. The processor includes one or more processor cores that accesses the data at the memory in order to perform tasks on behalf of an electronic device. To balance better processing efficiency with system costs, a processing system can employ different types of memory modules to store different portions of the data. For example, the processing system can include relatively fast memory modules to store data that is expected to be accessed relatively frequently and relatively slow, but less expensive, memory modules to store data that is expected to be accessed relatively infrequently. Further, the processing system can implement a memory management scheme whereby the system moves different portions of the data among the different types of memory modules based on changes in the expected frequency of data access. To support such a memory management scheme, a processing system can monitor which portions of the data are accessed at the memory modules. However, conventional approaches to memory access monitoring place a relatively high demand on system resources, and do not perform efficiently for different types of processor applications.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate techniques for tracking counts of accesses to memory pages using a set of counters located at the memory module that stores the pages, wherein the counts are adjusted at least in part based on refreshes of the memory pages. This approach allows a processing system to efficiently maintain the counts with relatively small counters and with relatively low overhead. Furthermore, in some embodiments the rate at which the counters are adjusted, relative to the page refreshes, is adjustable, so that the access counts are useful for a wide variety of application types.

To illustrate, in some embodiments a memory module includes a corresponding counter for each of a plurality of memory pages. In response to a memory access to a memory page, the memory module may automatically increase the counter for the memory page. In addition, every N refresh cycles the memory module may decrease the counters for memory page(s) under refresh. The counters of the memory module thus reflect the relative frequency with which each memory page is accessed. The counters can therefore be used for any of a variety of memory management schemes. Further, because the counters are largely managed by logic of the memory module, the memory access counts can be generated with relatively low processor overhead. In addition, the storage overhead on the processor side is minimal as page counts are stored and maintained in memory.

Figure 1:
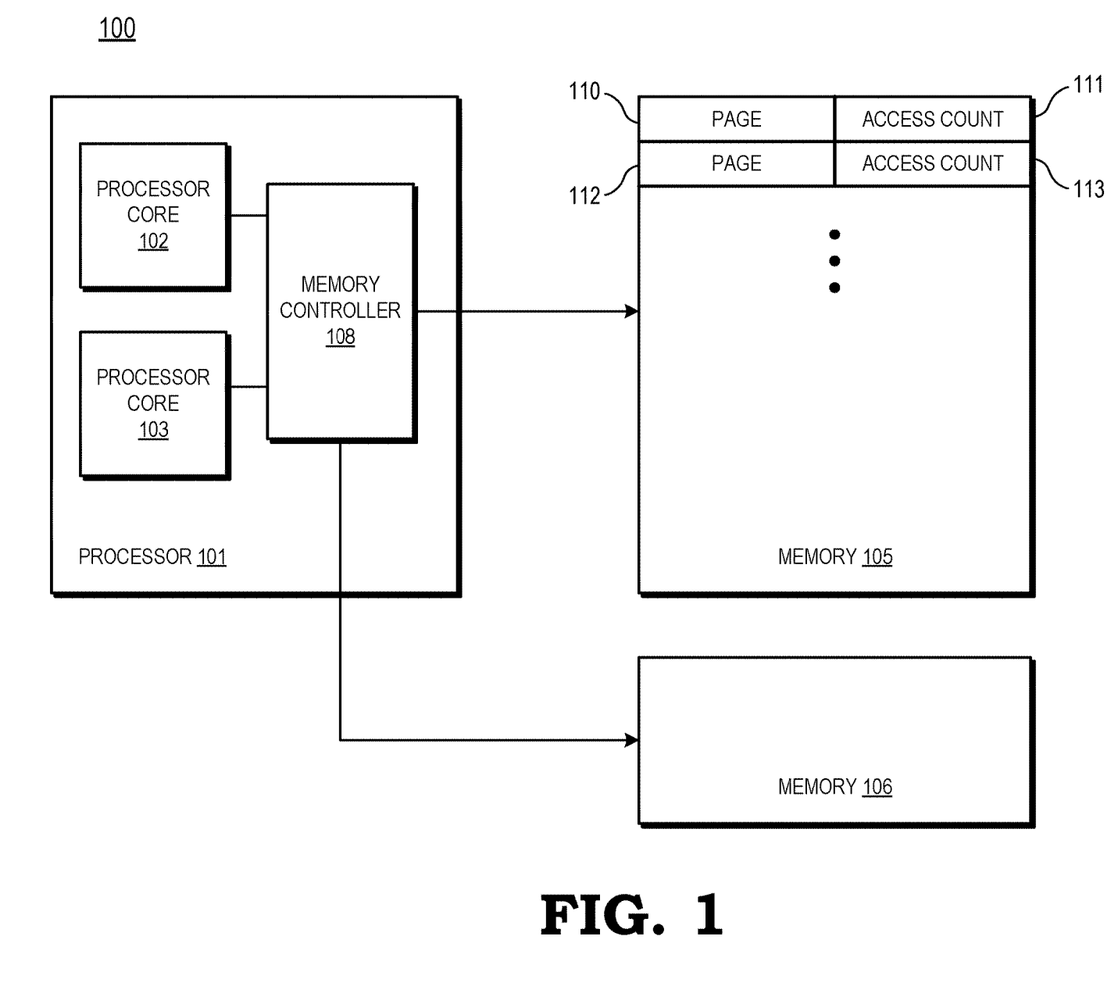
FIG. 1 is a block diagram of a processing system that tracks counts of accesses to memory pages based in part upon page refreshes in accordance with some embodiments.

FIG. 1 illustrates a block diagram of a processing system 100 that tracks counts of accesses to memory pages based in part upon page refreshes in accordance with some embodiments. The processing system 100 executes instructions (e.g., computer programs) to carry out tasks for an electronic device, such as a desktop computer, laptop computer, server, smartphone, tablet, game console, and the like. To facilitate execution of instructions, the processing system 100 includes a processor core 101 and a set of memory modules (e.g., memory 105 and memory 106). The processor 101 includes one or more processor cores (e.g., processor cores 102 and 103) each having one or more instruction pipelines to execute program threads or other sets of instructions.

The memory 105 and 106, together with any other memory modules of the processing system 100, form the system memory in a memory hierarchy of the processor 101. Accordingly, the memory 105 and 106 store data (e.g., program data and instructions) for the sets of instructions executed at the processor 101. In some embodiments the processing system 101 includes additional modules that access data at the memory modules 105 and 106, such as a graphics processing unit (GPU), an input/output memory management unit (IOMMU), and the like.

In the course of executing instructions, the processor 101 generates operations, referred to as memory accesses, to store and retrieve data from the system memory. Examples of memory accesses include read accesses to read data from a memory location and write accesses to store data at a memory location. Each memory location is associated by the processing system 100 with a memory address, and each memory access includes the memory address corresponding to the memory location targeted by the memory access. To facilitate execution of the memory accesses, the processor 101 includes a memory controller 108. The memory controller 108 receives memory accesses from the processor cores 102 and 103, buffers the received memory accesses, schedules the different memory accesses for execution at the memory 105 and 106 based on the memory addresses targeted by the memory accesses, and provides commands to the memory 105 and 106 in order to execute the memory accesses. In addition, for read accesses, the memory controller 108 manages receipt of read data from the memory 105 and the memory 106 and manages provision of the read data to the processor core that generated the read access operation.

The processing system 100 employs a heterogeneous memory architecture, wherein different memory modules of the processing system are of different memory types. For example, in one embodiment the memory 105 is a dynamic random-access memory (DRAM) memory module and the memory 106 is a non-volatile memory (NVM) module, such as a flash memory module. In other embodiments, the memory 105 is a RAM module of a first type, such as a static random-access memory (SRAM) module and the memory 106 is a RAM module of a different type, such as a DRAM module. In still other embodiments, the memory 105 and the memory 106 are both DRAM modules but have different access speeds and power consumption characteristics.

In some embodiments, one or more of the memory modules 105 and 106 is a RAM module or other type of memory module whose stored data is periodically refreshed. For example, in some embodiments the memory 105 is a DRAM module wherein the data stored at the module is periodically refreshed by copying the data from the storage units (e.g., a memory row) to a buffer (e.g., a row buffer) and then writing the data back from the buffer to the storage units. The set of operations executed by a memory module to refresh a given unit of memory is referred to as a "refresh cycle" for the given unit.

To enhance system efficiency the processing system 100 employs a specified memory management scheme that governs which memory module stores given portions of data. To implement the memory management scheme, the processing system 100 divides the memory addresses of the system into logical entities referred to herein as memory pages, or simply pages (e.g., pages 110, 112). The processor 101, or other memory management module (not shown) moves pages among the different memory modules according to the rules of the memory management scheme. For example, in some embodiments the processor 101 implements the memory management scheme by moving pages that are expected to be accessed relatively frequently to the memory module having faster access speed and moving pages that are expected to be accessed relatively infrequently to the memory module having slower access speed.

To support some memory management schemes, it is useful for the processing system to identify memory pages that are accessed relatively frequently (referred to as "hot" memory pages) and memory pages that are accessed relatively infrequently. Accordingly, to support such memory management schemes the memory module 105 maintains a counter (e.g., counters 111 and 113) for each memory page that stores a count of memory accesses for the memory page. For example, the counter 111 stores a memory access count for the page 110 and the counter 113 stores a memory access count for page 112. In some embodiments, each counter is a small portion of the memory page itself. In other embodiments, each counter is stored in a separate portion of the memory 105, such as in a relatively small set of SRAM cells. In still other embodiments, the memory 105 is in a stacked memory arrangement with the processor 101, and the counters (e.g., counters 111, 113) are part of the logic layer of the stacked memory.

In operation, in response to receiving a memory access command (e.g., a read command, a write command, or a row activate command) targeting a portion of a memory page or the entirety of a page, the memory 105 increments or adjusts the counter for that memory page. Thus, for example, in response to a receiving a memory access command targeting the memory page 110, the memory 105 increments the counter 111. In some embodiments, the memory 105 includes logic to automatically increment the counter in response to a memory access command. The logic obviates the need for the memory controller 108 to issue a separate command to increment the counter, thus reducing the overhead associated with monitoring memory access counts at the processing system 100.

The memory controller 108 sends refresh commands to the memory 105. In some embodiments, the refresh commands are generated internally by the memory 105. In response to a refresh command (designated a REFRESH command herein), the memory 105 refreshes the data of at least one memory page by writing that data to a buffer and then writing the data at the buffer back to the page. As noted above, this process is referred to as a refresh cycle for the page. Further, for every N refresh cycles of a page (where N is an integer), the memory controller 108 sends a special refresh command, referred to herein as a REFRESH_C command, to the memory 105. In response to the REFRESH_C command for a memory page, the memory 105 refreshes the memory page and, in addition, decrements, adjusts, or resets the memory access counter for the page. The memory 105 refreshes a group of memory pages in response to a REFRESH command and, in response to a REFRESH_C command refreshes a group of memory pages and decrements the memory access counters associated with them. In some embodiments, the memory controller 108 sends a variation of REFRESH_C command to decrement or adjust the memory access counters of all or a subset of pages. Further, in some embodiments the memory 105 itself keeps track of the refresh cycles, and automatically decrements the memory access counters every N refresh cycles.

In addition, the memory controller 108, based on a programmable interval, sends the memory 105 an RC REFRESH command. In response, the memory 105 sends the values of the access counts to the memory controller 108 and resets each access count to an initial value. In some embodiments, the interval between RC REFRESH commands is different than the interval between REFRESH_C commands.

By decrementing the memory access counts every N refresh cycles, the processing system 100 ensures that the memory access counters reflect the relative frequency of memory accesses to each memory page, rather than the absolute number of memory accesses to each page. This allows the processing system 100 to employ counters having relatively few bits, minimizing the storage overhead. For example, in some embodiments the counters 111 and 113 each store a count value of less than five bits. In turn, this allows the processing system 100 to monitor memory accesses efficiently, without a large increase in the size of the memory 105 and without consuming a relatively large portion of each memory page to store the memory access count.

The value of N is a programmable or adjustable value that is set by a programmer, runtime library, or operating system and is individually set for each program executed at the processing system 100. The memory controller 108 (or software executing at the processing system 100) periodically adjusts the value of N based on specified criteria. This allows the memory access counts to more accurately reflect the relative frequency of memory accesses to the different memory pages for a wide variety of applications and memory access patterns. For example, in some embodiments the memory controller 108 identifies a hot memory page as a memory page whose memory access count exceeds a first threshold and identifies a cold memory page whose memory access count is below a second threshold. The memory controller 108 adjusts N based on the number of hot memory pages and the number of cold memory pages at the memory 105. For example, in response to determining that the percentage of hot memory pages at the memory 105 is below a third threshold, the memory controller 105 increases N, thereby reducing the frequency with which memory access counts are decremented. In response to determining that the percentage of hot memory pages is above a fourth threshold, the memory controller 105 decreases N, thereby increasing the frequency with which memory access counts are decremented. The memory controller 108 thereby attempts to keep the percentage of hot memory pages within a specified range, improving the utility of the memory access counts for memory management.

Figure 2:
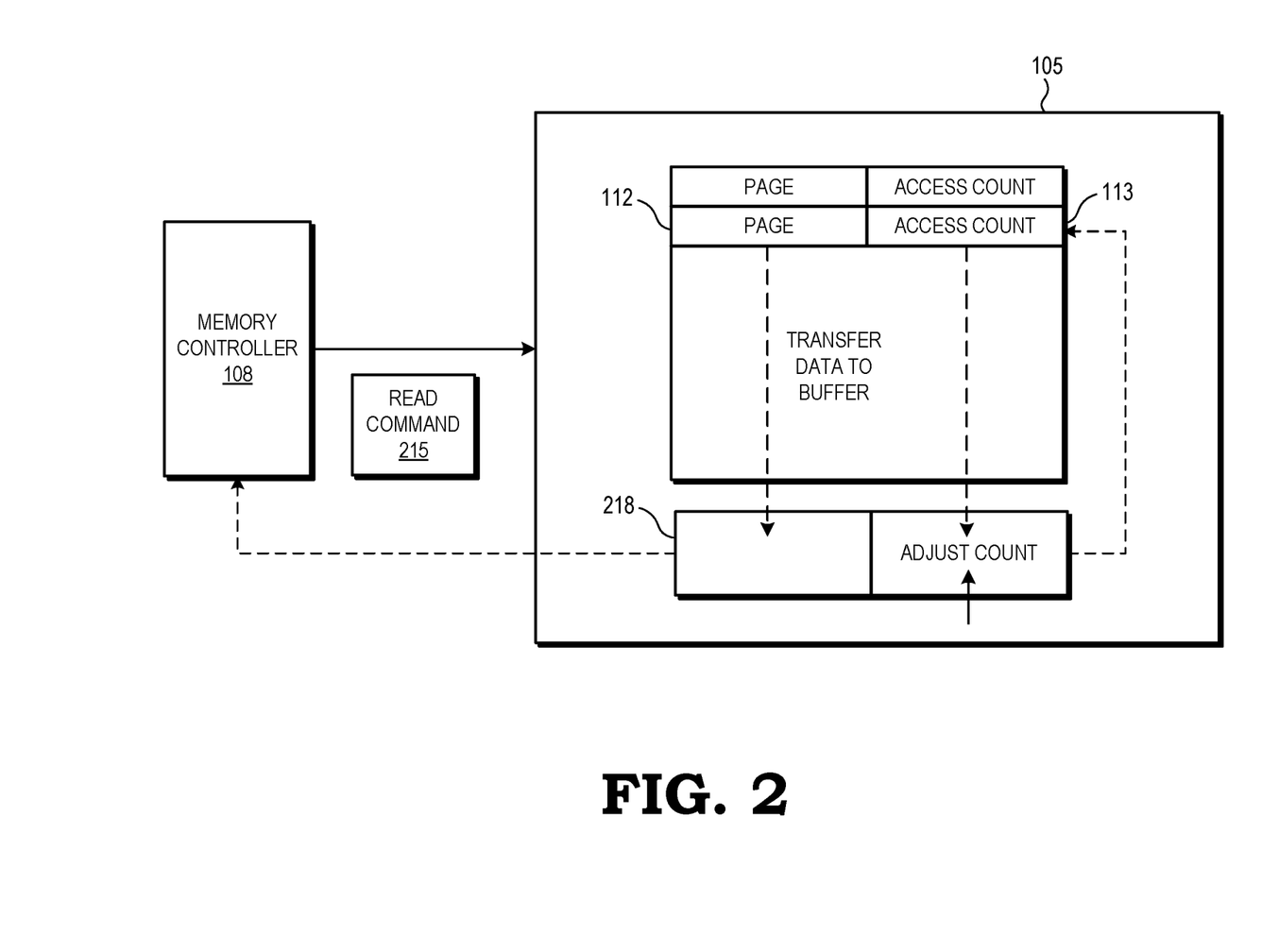
FIG. 2 is a block diagram of an example of the processing system of FIG. 1 increasing a count of accesses to a memory page in response to a page access in accordance with some embodiments.

FIG. 2 illustrates an example of the processing system 100 increasing a count of accesses to a memory page in response to a page access in accordance with some embodiments. In the depicted example, the memory controller 108 has received a read access (not shown) from one of the processor cores 102 and 103. It is assumed that the read access targets a portion of the memory page 112. In response to the read access, the memory controller 108 generates a read command 215 and provides the command to the memory 105.

In response to the read command 215, the memory 105 transfers both the memory page 112 and the counter 113 to a row buffer 218. The memory 105 then transfers the page 112 (or the portion thereof targeted by the read access) to the memory controller 108 for subsequent provision to the processor core that generated the read access. In addition, in response to the read command 215 the memory 105 automatically increments the access counter 113 at the row buffer 218, and then stores the adjusted access counter 113 with the memory page 112. Thus, the memory 105 automatically adjusts the access counter 113 in response to a memory access command targeting the memory page 112, without requiring a separate command to adjust the access count. The memory 105 thus supports tracking of accesses to memory pages without substantially increasing overhead at the processing system 100.

Figure 3:
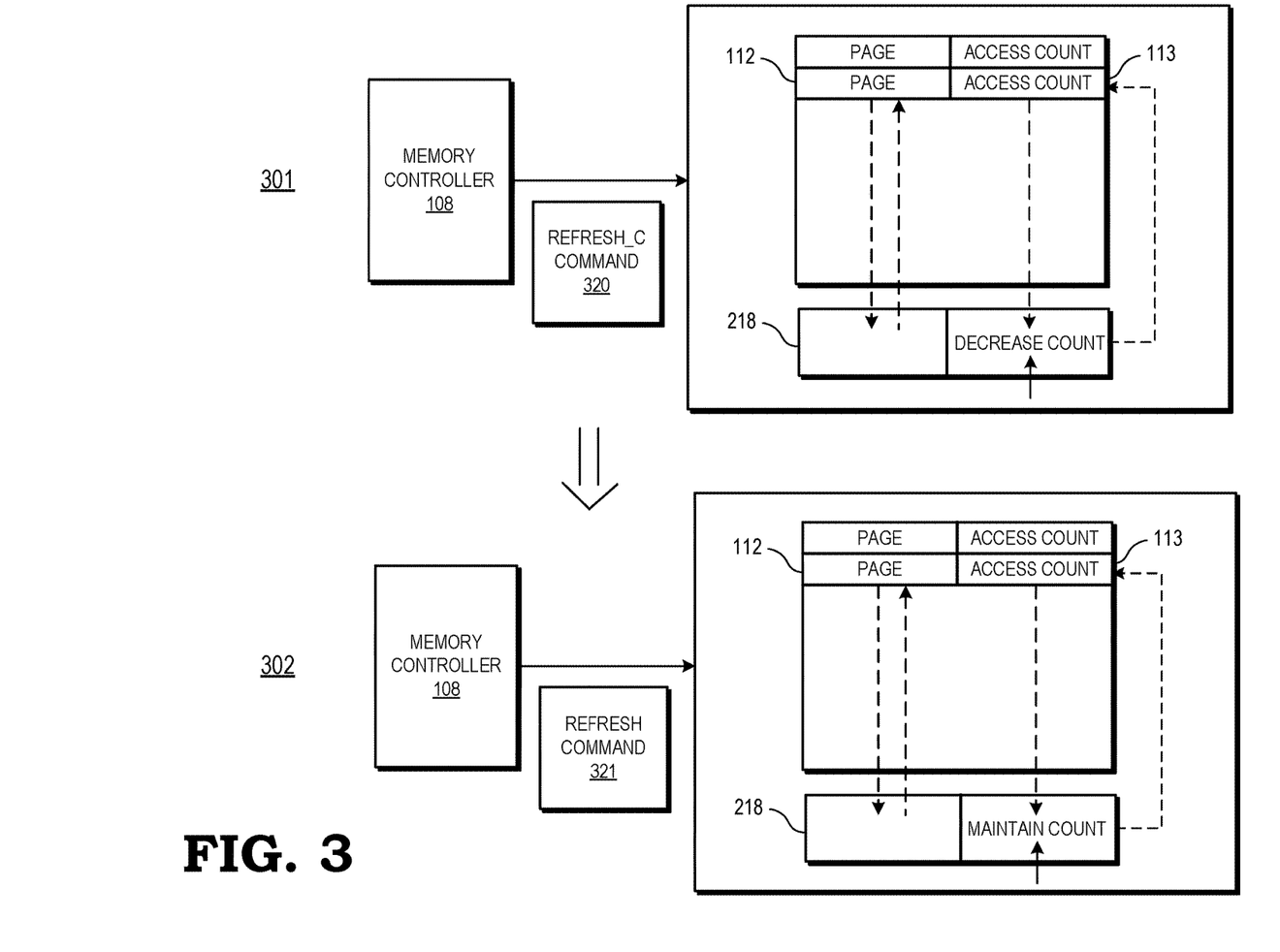
FIG. 3 is a block diagram of an example of the processing system of FIG. 1 periodically decreasing a count of accesses to a memory page during a designated refresh cycle in accordance with some embodiments.

FIG. 3 is a block diagram of an example of the processing system 100 periodically decreasing a count of accesses to a memory page during a designated refresh cycle in accordance with some embodiments. The depicted example illustrates two different refresh cycles for the memory page 112, designated refresh cycle 320 and refresh cycle 321. For refresh cycle 320, the memory controller 108 determines that the cycle is an Nth refresh cycle. In response the memory controller 108 sends the memory 105 a REFRESH_C command for the memory page 112. In response to the REFRESH_C command, the memory 105 transfers the memory page 112 and the access counter 113 to the row buffer 218. The memory 105 automatically decrements the access counter 113 at the row buffer 218, then writes the decremented access counter 113 and the memory page 112 back from the row buffer 218 to their original storage location at the memory 105, thereby refreshing the page.

For refresh cycle 321, the memory controller 108 determines that the cycle is not an Nth refresh cycle. In response the memory controller 108 sends the memory 105 a REFRESH command for the memory page 112. In response to the REFRESH command, the memory 105 transfers the memory page 112 and the access counter 113 to the row buffer 218. The memory 105 maintains the value of the access counter 113 at the row buffer 218, then writes the access counter 113 and the memory page 112 back from the row buffer 218 to their original storage location at the memory 105, thereby refreshing the page. In other embodiments, in response to the REFRESH command the memory 105 does not transfer the access count 113 to the row buffer 218. Thus, by using different refresh commands, the memory controller 108 determines when memory access counts are decremented. The memory controller 108 can thereby support different memory management schemes and can effectively track memory accesses for a variety of different types of applications and memory access patterns.

In some embodiments, a memory includes different access counters for read and write commands. In the example illustrated at FIG. 4, a memory 405 stores a set of memory pages (e.g., memory page 410). For each memory page, the memory 405 includes a write access count and a read access count. For example, the memory 405 stores a write access count 425 and a read access count 426 for the memory page 410. The memory 405 adjusts the read and write access counts for each memory page in similar fashion to the examples of FIGS. 2 and 3 above.

Figure 4:
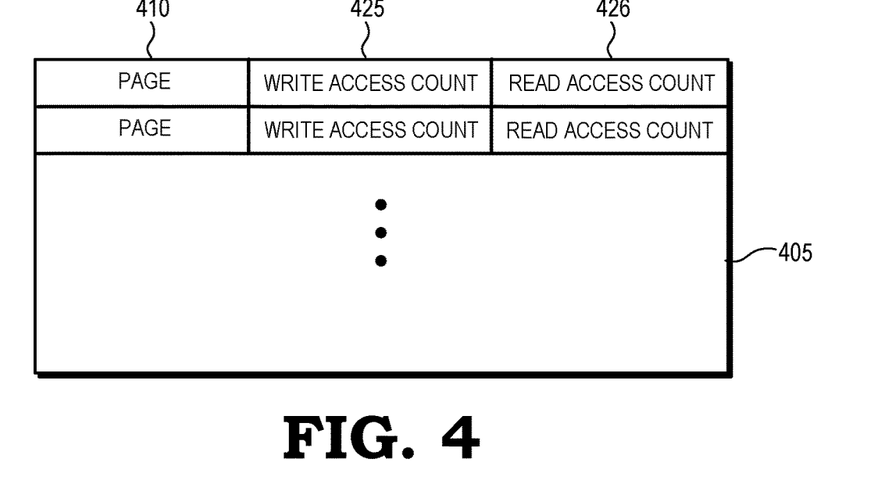
FIG. 4 is a block diagram of an example of the processing system of FIG. 1 employing separate counts for read accesses and write accesses to a memory page in accordance with some embodiments.

For example, in response to receiving a read command targeting the memory page 410, the memory 405 loads the memory page 410 to a row buffer (not shown) along with the write access count 425 and the read access count 426. The memory 405 increments the read access count 426, maintains the write access count 425 at its current value, and writes the access counts 425 and 426 from the row buffer back to the memory page 410. Similarly, in response to receiving a write command targeting the memory page 410, the memory 405 loads the memory page 410 to the row buffer along with the write access count 425 and the read access count 426. The memory 405 increments the write access count 425, maintains the read access count 426 at its current value, and writes the access counts 425 and 426 from the row buffer back to the memory page 410.

In response to receiving a REFRESH command for the memory page 425, the memory 405 loads the memory page 410 to the row buffer along with the write access count 425 and the read access count 426. The memory 405 maintains both the write access count 425 and the read access count 426 at their current values and writes the access counts 425 and 426 from the row buffer back along with writing back the memory page 410. In response to receiving a REFRESH_C command for the memory page 425, the memory 405 loads the memory page 410 to the row buffer along with the write access count 425 and the read access count 426. The memory 405 decrements both the write access count 425 and the read access count 426 and writes the decremented access counts 425 and 426 from the row buffer back along with writing back the memory page 410. By employing separate read and write access counts, the memory 405 supports flexible memory management schemes.

Figure 5:
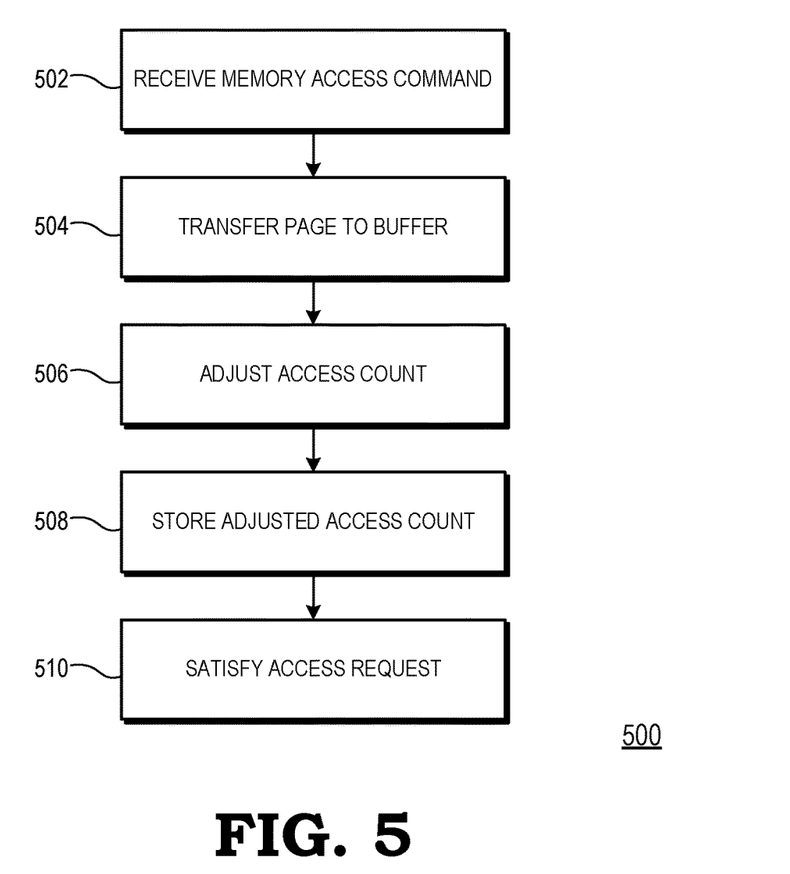
FIG. 5 is a flow diagram of a method of increasing a count of accesses to a memory page in response to a page access in accordance with some embodiments.

FIG. 5 is a flow diagram of a method 500 of increasing a count of accesses to a memory page in response to a page access in accordance with some embodiments. The method 500 is described with respect to an example embodiment at the processing system 100 of FIG. 1. At block 502, the memory controller 108 generates a memory access command (read or write command) in response to receiving a memory access request from a processor core. The memory controller 108 provides the memory access command to the memory 105. In response, at block 504 the memory 105 transfers the page targeted by the memory access command to the row buffer 218, including transferring the access count for the targeted memory page to the row buffer 218. At block 506 the memory 105 adjusts the access count at the row buffer 218. At block 508 the memory 105 writes the adjusted access count back to the memory page. At block 510 the memory 105 satisfies the memory access request by providing data from the row buffer 218 to the memory controller 108 (in the case of a read access) or by modifying the data at the row buffer 218 and writing the modified memory page back to memory (in the case of a write access).

Figure 6:
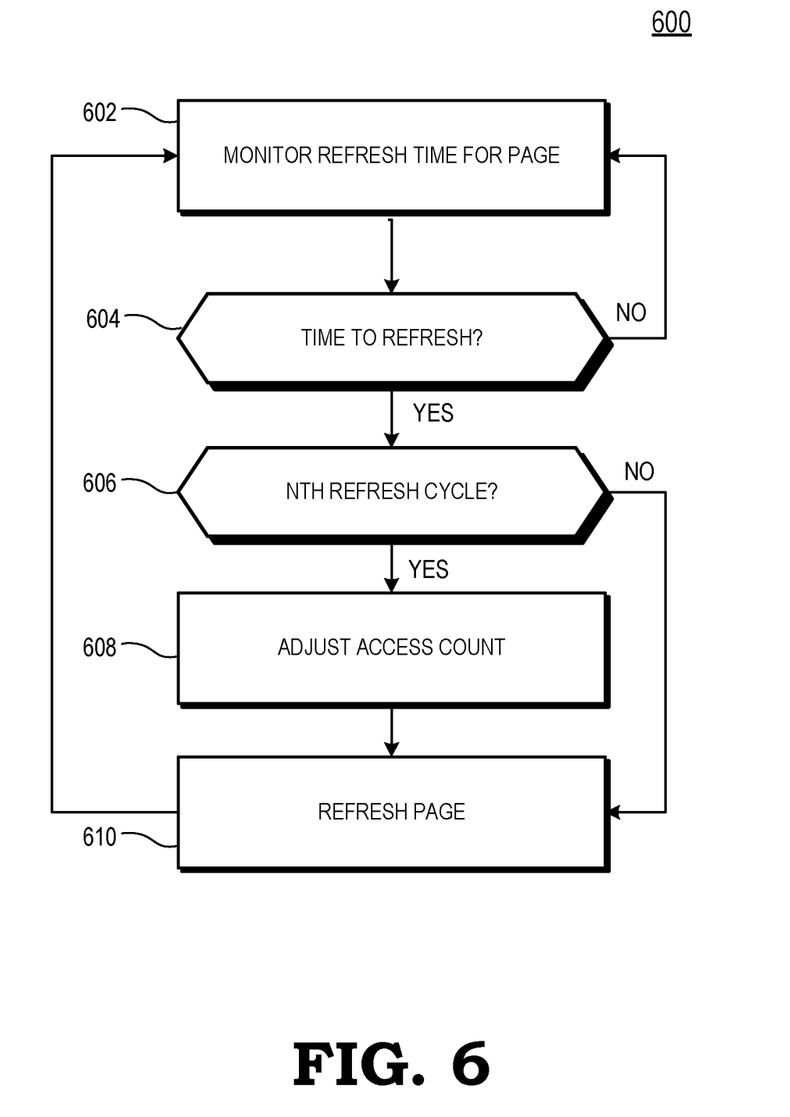
FIG. 6 is a flow diagram of a method of decreasing a count of accesses to a memory page during a designated refresh cycle in accordance with some embodiments.

FIG. 6 is a flow diagram of a method 600 of decreasing a count of accesses to a memory page during a designated refresh cycle in accordance with some embodiments. The method 600 is described with respect to an example implementation at the processing system 100 of FIG. 1. At block 602 the memory controller 108 monitors a free-running counter or other timing module to determine the timing of refresh cycles for the memory 105. At block 604 the memory controller 108 determines, based on the timing module, if a specified period of time has elapsed between refresh cycles for a memory page. If not, the method flow returns to block 604. In response to determining, at block 604, that the period of time has elapsed, the memory controller 108 determines that it is time to initiate a refresh cycle for the memory page. In response, the method flow moves to block 606 and the memory controller 108 determines if the refresh cycle is an Nth refresh cycle (that is, if the current refresh cycle number is an integer multiple of N), where N is an integer. In some embodiments N is an integer greater than two. In some embodiments, N is an adjustable value based on, for example, an identified number of hot memory pages at the memory 105.

In response to determining, at block 606, that the refresh cycle is not an Nth refresh cycle, the memory controller 108 issues a REFRESH command to the memory 105 for the memory page, and the method flow proceeds to block 610, described below. In response to determining, at block 606, that the refresh cycle is an Nth refresh cycle, the memory controller 108 issues a REFRESH_C command and the method flow proceeds to block 608. At block 608, the memory 105 executes the REFRESH_C command by decrementing the access count for the memory page being refreshed. In different embodiments, rather than decrementing the access count, the memory 105 subtracts a defined value from each access count, shifts the value of each access count, or sets each access count to an initial value. The method flow proceeds to block 610 and the memory 105 refreshes the memory page (either based on the REFRESH_C command or the REFRESH command).

Figure 7:
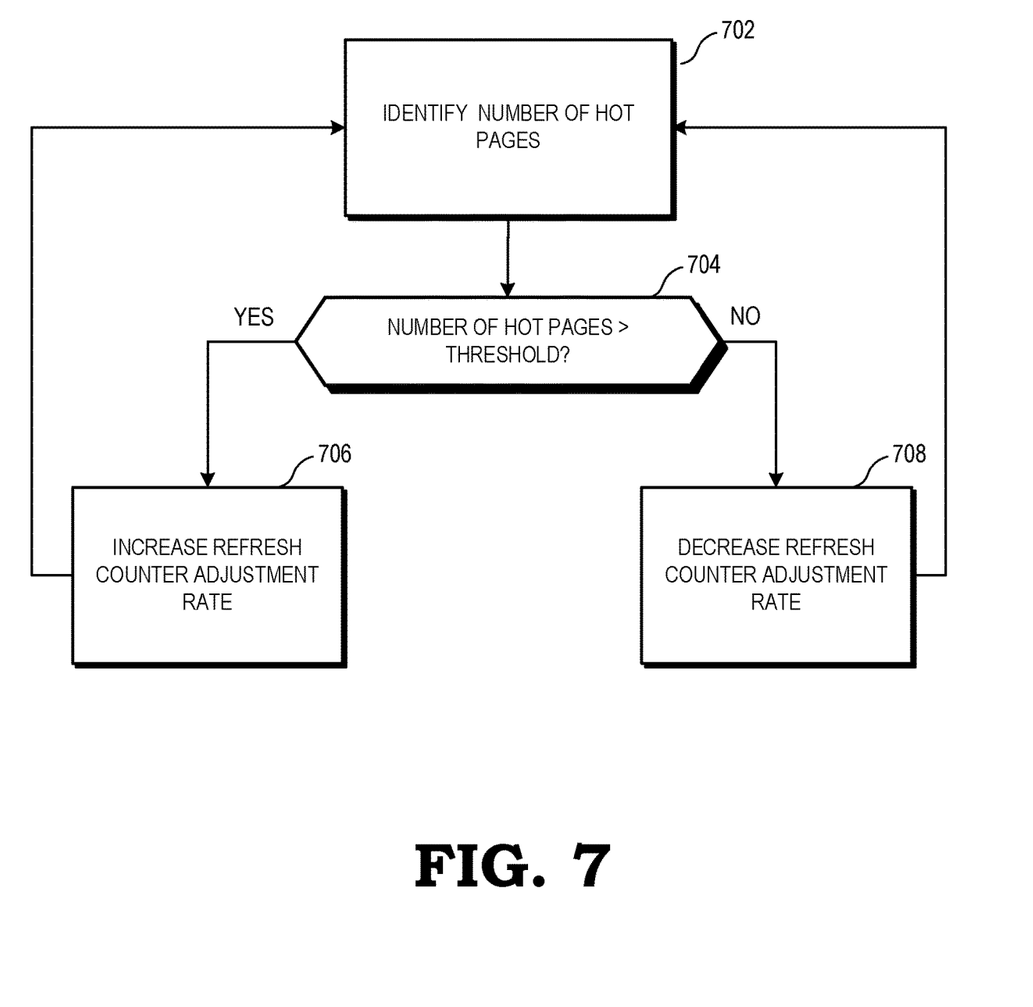
FIG. 7 is a flow diagram of a method of adjusting a rate at which a count of accesses to a memory page is adjusted in accordance with some embodiments.

FIG. 7 is a flow diagram of a method 700 of changing a rate at which a count of accesses to a memory page is adjusted based on refresh cycles of a memory in accordance with some embodiments. The method 700 is described with respect to an example implementation at the processing system 100 of FIG. 1. At block 702 the memory controller 108 determines a number of hot pages at the memory 105. The memory controller 108 determines that a memory page is hot by comparing the memory access count for the memory page to a specified threshold. If the memory access count exceeds the specified threshold, the memory controller 108 identifies the memory page as a hot memory page. The memory controller periodically retrieves the memory access counts for all or a subset of memory pages at the memory 105, optionally stores all or some of the counters in storage buffer and compares each memory access count to the specified threshold, thereby periodically identifying hot pages and their total number at the memory 105.

At block 704, the memory controller 108 compares the number of hot memory pages, as identified at block 702, to a threshold. In some embodiments, the threshold reflects a percentage of the total number of memory pages at the memory 105 (e.g., 80%). In response to determining that the number of hot memory pages is above the threshold, the method flow moves to block 706 and the memory controller 108 decreases the value of N, ensuring that the memory controller 108 issues REFRESH_C commands more frequently. That is, if the memory controller 108 determines that there are too many hot pages, relative to the threshold number, the memory controller 108 effectively increases the rate at which the access counts for memory pages are decremented, thus reducing the number of hot memory pages.

If, at block 704, the memory controller 108 determines that the number of hot memory pages is below the threshold, the method flow proceeds to block 708 and the memory controller 108 increases the value of N, ensuring that the memory controller 108 issues REFRESH_C commands less frequently. That is, if the memory controller 108 determines that there are too few hot pages, relative to the threshold number, the memory controller 108 effectively decreases the rate at which the access counts for memory pages are decremented, thus increasing the number of hot memory pages. Thus, using the method 700, the memory controller 108 adjusts the rate at which the page access counts are decremented to maintain the number of hot memory pages at or near the threshold. This ensures that the number of hot memory pages at the memory 105 is less sensitive to different memory access patterns.

In some embodiments, the memory controller 108 does not adjust the value of N but instead adjusts the adjustment amount for each counter—that is how much the counters are decreased by each Nth refresh. In other embodiments the memory controller both adjusts the value of N and adjusts the adjustment amount for each counter. In still other embodiments the memory controller 108 can apply different values of N to different memory pages, such that the access count for one page is adjusted at one rate while the access count for a different page is adjusted at a different rate. For example, in some embodiments the access count for one page is decremented every five refresh cycles while the access count for another page is decrements every 8 refresh cycles.

In some embodiments, the memory controller 108 changes the rate at which the page access counts are decremented based on the number of cold memory pages rather than the number of hot memory pages. In other embodiments, the memory controller 108 employs both the number of hot memory pages and the number of cold memory pages to set the rate at which page access counts are decremented. For example, in some embodiments the memory controller 108 adjusts the rate at which the page access counts are decremented to keep the number of hot memory pages and the number of cold memory pages within a specified range (e.g. fewer than 20% cold memory pages and no more than 80% hot pages).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to a first access to a first memory page at a first memory, adjusting a first access count by a first adjustment;
   in response to a first refresh of the first memory page at the first memory, adjusting the first access count by a second adjustment; and
   managing locations of a plurality of memory pages at a plurality of memories based on the first access count, wherein managing comprises:
     transferring the first memory page from the first memory to a second memory based on the first access count exceeding an access count threshold.

2. The method of claim 1, further comprising:
   executing the first access at the first memory in response to a first command; and
   wherein adjusting the first access count by the first amount comprises adjusting the first access count in response to the first command.

3. The method of claim 2, further comprising:
   executing the first refresh of the first memory page in response to a second command; and
   wherein adjusting the first access count by the second adjustment comprises adjusting the first access count in response to the second command.

4. The method of claim 1, wherein the first adjustment has a different magnitude than the second adjustment.

5. The method of claim 1, further comprising:
   in response to a second refresh of the first memory page, maintaining the first access count.

6. The method of claim 1, further comprising:
   for every N refreshes of the first memory page, adjusting the first access count by the second amount, where N is an integer greater than 1.

7. The method of claim 6, wherein N is an adjustable value.

8. The method of claim 7, further comprising:
   setting N based on a threshold number of memory pages of the first memory each being associated with a threshold count of memory accesses.

9. The method of claim 7, further comprising:
   determining a number of memory pages associated with a threshold count of memory accesses; and
   adjusting N in response to the determined number of memory pages being outside a specified range.

10. The method of claim 1, further comprising:
    in response to a second access to a second memory page at the first memory, adjusting a second access count by the first adjustment;
    in response to a second refresh of the second memory page at the first memory, adjusting the second access count by the second adjustment; and
    managing locations of a plurality of memory pages at the plurality of memories based on the second access count.

11. A method, comprising:
    increasing a counter at a first memory in response to memory accesses to a memory page stored at the memory;
    decreasing the counter in response to every N refresh cycles, where N is an integer; and
    managing data stored at the memory based on the counter, wherein managing comprises:
      transferring the memory page from the first memory to a second memory based on the counter exceeding an access count threshold.

12. The method of claim 11, further comprising:
    periodically adjusting N based on the counter.

13. A device, comprising:
    a first memory to store:
      a first memory page; and
      a second memory page;
    the first memory configured to:
      in response to a first access to a first memory page, adjust a first access count by a first adjustment;
      in response to a first refresh of the first memory page at the memory, adjust the first access count by a second adjustment
    a memory controller to manage data stored at the first memory and a second memory, wherein managing comprises:
      transferring the first memory page from the first memory to the second memory based on the first access count exceeding an access count threshold.

14. The device of claim 13, wherein the first memory is further configured to:
  execute the first access at the first memory in response to a first command; and
  wherein adjusting the first access count by the first amount comprises adjusting the first access count in response to the first command.

15. The device of claim 14, wherein the first memory is further configured to:
  executing the first refresh of the first memory page in response to a second command; and
  wherein adjusting the first access count by the second amount comprises adjusting the first access count in response to the second command.

16. The device of claim 13, wherein the first adjustment has a different magnitude than the second adjustment.

17. The device of claim 13, wherein the first memory is further configured to:
  in response to a second refresh of the first memory page, maintain the first access count.

18. The device of claim 13, wherein the first memory is further configured to:
  for every N refreshes of the first memory page, adjust the first access count by the second amount, where N is an integer greater than 1.

19. The device of claim 18, wherein N is an adjustable value.

20. The device of claim 19, further comprising a memory controller configured to:
  set N based on a threshold number of memory pages of the first memory each being associated with a threshold count of memory accesses.

* * * * *